United States Patent [19]

Crabtree

[11] Patent Number: 4,551,759
[45] Date of Patent: Nov. 5, 1985

[54] SAMPLE VIDEO AMPLIFIER

[75] Inventor: Daniel L. Crabtree, Ridgecrest, Calif.

[73] Assignee: The United States of America as represented by the Secretary of the Navy, Washington, D.C.

[21] Appl. No.: 484,657

[22] Filed: Apr. 13, 1983

[51] Int. Cl.$^4$ .............................................. H04N 3/14
[52] U.S. Cl. ..................................................... 358/213
[58] Field of Search ........................ 358/184, 212, 213

[56] References Cited

U.S. PATENT DOCUMENTS

| | | | |
|---|---|---|---|
| 3,781,574 | 12/1973 | White et al. | 307/304 |
| 4,189,751 | 2/1980 | Nagumo | 358/213 |
| 4,254,436 | 3/1981 | Harford | 358/157 |
| 4,274,113 | 6/1981 | Ohba et al. | 358/212 |
| 4,283,742 | 8/1981 | Izumita et al. | 358/213 |
| 4,287,441 | 9/1981 | Smith | 307/353 |
| 4,363,035 | 12/1982 | Lehmann | 358/213 |

Primary Examiner—Richard Murray
Attorney, Agent, or Firm—Robert F. Beers; W. Thom Skeer; Kenneth G. Pritchard

[57] ABSTRACT

A video amplifier for a raw video signal permits increasing the gain of the signal so that it stands out from background noise prior to processing. The amplifier uses a sample and hold circuit between two gain stages to permit the raw video signal to only be sampled at a preset rate. This type of device is especially suitable for charge coupled device video where sampling is desired after a predetermined integration time for the pixel elements of a CCD array. This processing permits low voltage level signals to be amplified relatively isolated from background noise and then processed after being amplified to a level significantly above processing noise. The final gain stage permits amplifying suitable for standard video monitors to use the signal.

2 Claims, 4 Drawing Figures

SAMPLE VIDEO AMPLIFIER

BACKGROUND OF THE INVENTION

1. Field of the Invention

The present device pertains to video amplifiers. Specifically, the present device pertains to video amplifiers which are clocked at a sampling rate suitable for use with charge coupled devices.

2. Description of the Prior Art

Charge coupled devices, CCDs, have become a new electronic device for securing and transmitting video images. They are also known as bucket brigade devices. The fundamental principle of a CCD camera is to focus a field of view on a charge coupled device array of pixels. The number of pixels in the area provides a direct control over the quality of the picture. In general, the scene is integrated in a set time and then all pixels are read out to form a composite image. Previous devices have relied on bandpass filters to limit the amount of noise that is transmitted in the processing signal.

FIG. 1 shows a typical integration chart of amplitude versus time for a given pixel of a charge coupled device. The sharp lines between the jagged irregular saw teeth represent noise spikes. The time period for these noise spikes is very brief. The corresponding frequency of these short time periods, the inverse of the time period, causes processing techniques to center on filtering out high frequency components of the video signal. In general, high frequency components have been considered spurious information and therefore were not preserved in processing hierarchy because they permitted large amounts of noise to be processed with the signal. Prior art devices have had bandpass filters with cutoffs of approximately 1.5 MHz to 6 MHz.

The expansion of pixel arrays to larger and larger numbers of elements provides improved imaging for charge coupled device, CCD, cameras. For high level processing, sharp edges can be used for automatic video readout. To enhance sharp edges it is preferred to keep high frequencies in the video signal. High frequencies define the sharpest edges in a signal and their exclusion by bandpass filtering results in a blurring of the edges that are otherwise possible.

Common circuit components include amplifiers, switches, sample and hold circuits and post amplification. However, these particular circuit components have not been previously combined in a manner which permits sampling of charge coupled device information suitable for sharp edge enhanced video using high frequency components.

SUMMARY OF THE INVENTION

The output video of a charge coupled device or of a CCD array is fed through a first gain stage which takes the relatively low voltages present in a CCD output and amplifies them to a processing level which will stay well defined and above the background noise that is inherent in the electronic processing stages themselves. The master clock signal which cycles the CCD array is mixed with a sampling signal to provide a switching signal which is locked to the master clock. Drifting of the master clock signal will cause the sampling signal to drift in a similar manner to keep the sample signal in the same relative position to the integration time of each individual pixel. The sample signal is used to trigger a switching circuit which only permits amplified signals from the CCD array to pass during the sample's signal presence. This switching circuit serves as a filter which screens background noise during the rest of the cycle. For appropriate timing, the switch only permits readout of the signal at the peak of each pixel. The signal passed by the switch is then fed to a sample and hold circuit which locks onto the signal and maintains that signal through the next sample period. Each time the switching circuit permits a new sample to pass, the sample and hold circuit cycles and acquires the new signal and holds it for another period. The held signal level is then passed through a second gain stage which provides a final amplification to bring the signal up to an ample level to be compatible with video monitors. Standard integrating circuitry is employed to this final gain signal to integrate each of the pixels in the CCD array to produce the composite picture that makes up the standard video picture similar to a television raster scan.

DESCRIPTION OF THE PREFERRED EMBODIMENT

Figure 1:
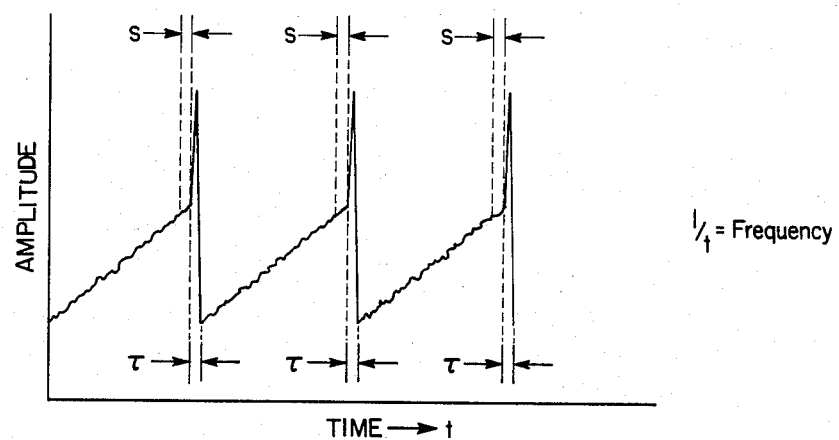
FIG. 1 is a graph of the standard integration characteristics for a pixel in a CCD array which is cycled at a periodic rate.

FIG. 1 shows a noise spike that occurs during a period, $\tau$. Prior to the start of $\tau$, the amplitude has reached the desired level for sampling. A sampling interval, s, starts prior to $\tau$ and terminates prior to $\tau$. The interval s corresponds to the desired sample pulse to be taken from the pixel. This avoids the noise spike during period $\tau$.

Figure 2:
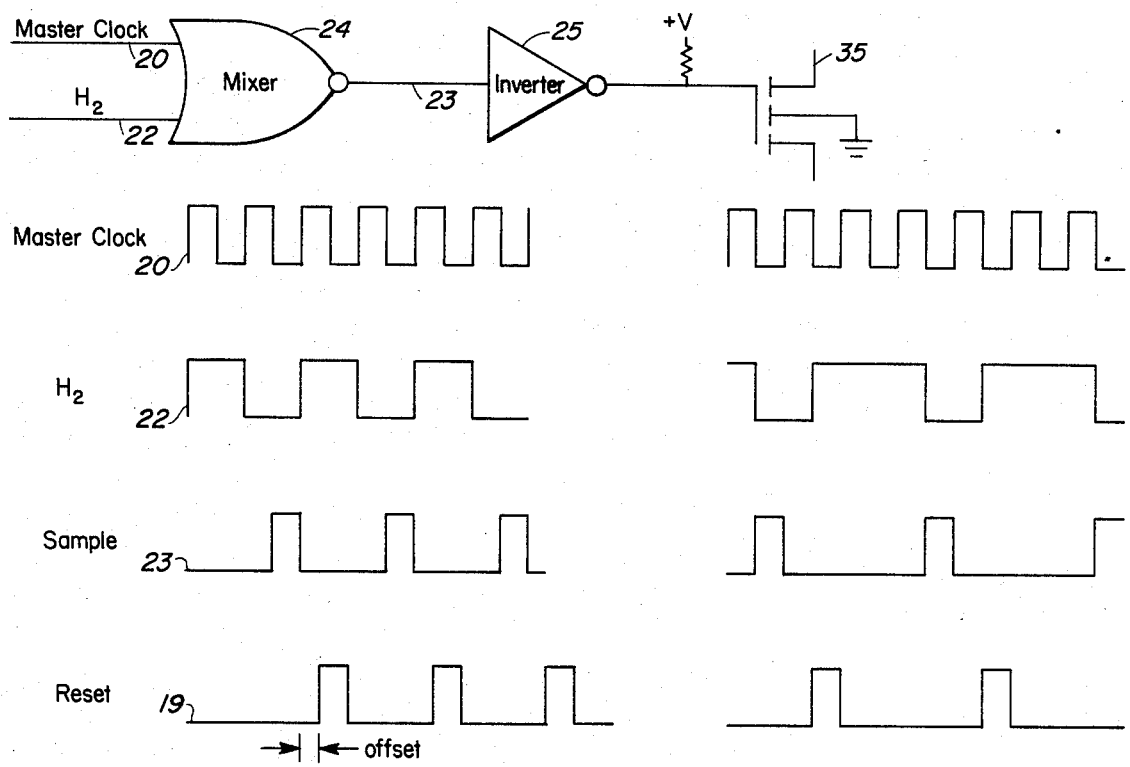
FIG. 2 is a timing diagram of how the present invention locks onto the master clock to provide a sample signal which drifts with the master clock.

FIG. 2 shows how a sample pulse is generated.

A master clock signal, represented by a square wave 20, and a horizontal shift clock signal, $H_2$, represented by square wave 22, are mixed in a mixer 24 to provide a composite sampling signal 23. An inverter 25 is used to reverse the amplitude for a switching transistor 35 which is driven by sample wave 23. A reset signal 19 lags the sample by a preselected time offset. CCDs are cycled in phases. The number of phases depends on the device. For example, in a 3-phase CCD, three horizontal shift clocks are needed to move information across one row of the CCD. These horizontal shift clocks have three signals, $H_1$, $H_2$, and $H_3$. The master clock is mixed with the horizontal shift clock signal, say $H_2$, that provides the best timing to match sample interval s. The sample pulse has a width which matches the overlap period between the master clock signal and the $H_2$ signal. Upon the completion of the sample signal, after a slight offset delay, a reset signal is provided.

Figure 3:
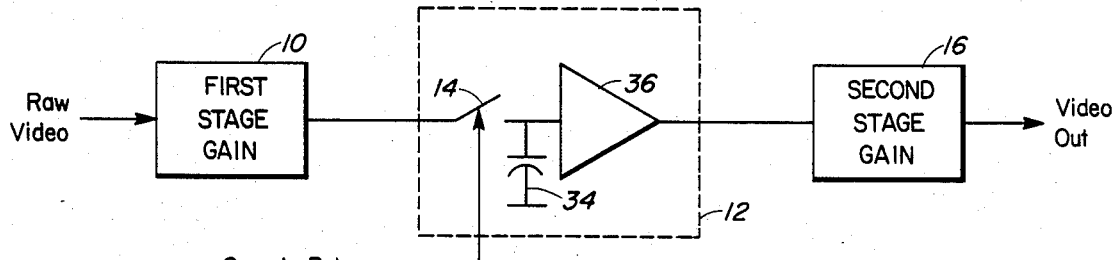
FIG. 3 is a block diagram of the present invention.

FIG. 3 is a block diagram of the present invention. A raw video signal from a CCD array provides a cyclical sampling of each and every pixel in the CCD array. The first stage gain 10 takes the CCD raw video signal which can be on the order of 15 millivolts and amplifies it to a level significantly above background noise. A sample and hold circuit 12 inputs the first stage gain output subject to a sample pulse switch 14 which, when opened, does not permit any sampling of signal in first stage gain 10. The advantage to this is that a sample and hold circuit will normally lock on the highest level it sees. If sample pulse switch 14 was a through connection, spurious noise in first stage gain 10 might produce a higher pulse, which would confuse the signal processing output of the camera. The amplifier portion of a hold circuit has a +1 gain as it seeks to hold a constant level. A second stage gain is represented by box 16 which amplifies the output from sample and hold circuit 12 to an appropriate output video level. This video level is fed to a seeker signal processor. Such a processor may be a computer, not shown. The effect of the process of a single pixel through the FIG. 3 arrangement is to have first stage gain 10 take raw video out of the array and gain it to a level where the video information is not effected by seeker noise. Sample and hold circuit 12 is timed to switch 14 to provide a high speed sample and hold during interval s. The video information is extracted from the raw video at the end of each pixel. Typically, a passive filter could be added to clean up video and to remove clocking noise and high frequency noise. However, this technique eliminates such passive filtering which is susceptible to temperature changes by looking at video only at a time of interest instead of all the time. Second stage gain 16 provides amplification of the video to the standard television amplitude. Each pixel goes through this process. The video monitor, in turn, displays each pixel and holds it while all pixels are cycled through until a composite picture is produced. Upon completion of the composite picture, the cycle repeats for every pixel in the CCD array, not shown.

Figure 4:
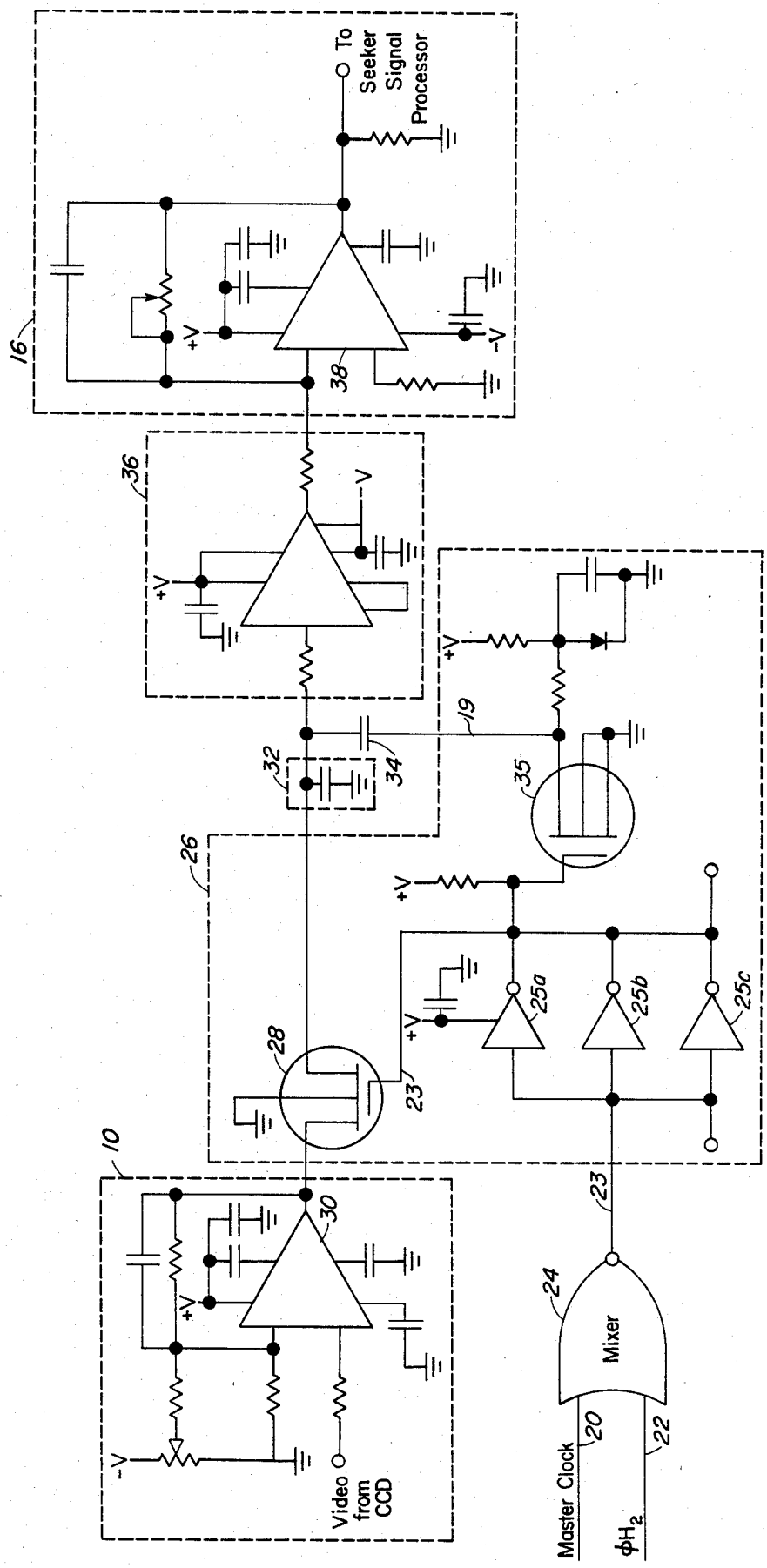
FIG. 4 is a circuit diagram of the present invention.

FIG. 4 is a circuit diagram of the present invention. Master clock signal 20 and a phase $H_2$ signal 22 are combined in a mixer 24. In turn, sample signal 23 is fed through a switching circuit 26 which has inverters 25a, 25b, and 25c to inverse the signal as shown in FIG. 2. Inverters 25a-c make the signal compatible with a switching transistor 28 by providing the proper amplitude to turn on. This inverted sample pulse is fed directly to switching transistor 28 which is connected in series between a first gain stage 10 and a sample capacitor 32. Capacitor 34 and a transistor 35 form a reset tie-in to switching circuitry 26 which clears the sample capacitor at the end of a sample and hold period. Switching circuitry 26 is one form of switch 14 shown in FIG. 3. The reset signal follows the sample pulse by a fixed offset time lag. Sample capacitor 32 is combined with hold circuitry 36 to provide a high impedance barrier once the sample capacitor is set. With switching transistor 28 open and a high impedance barrier in hold circuit 36, the sampled value remains protected during the hold period. The output from hold circuit 36 is then fed to a second gain stage 16 which serves as a final amplification stage of the signal being held. The amplification is fed to a video monitor or target tracker, not shown, at an acceptable level for standard television display. First gain stage 10 and second gain stage 16 have balancing circuit components for opamp 30 and 38 respectively.

In view of the above, it is obvious to those skilled in the art that modifications may be made to this invention consistent with the above disclosure.

What is claimed is:

1. A sample video amplifier for amplifying a raw video signal from a charge coupled device array having multiple phase horizontal shift signals and a master clock signal, comprising:
    a mixer for inputting said master clock signal and one of said horizontal shift signals and producing a sample signal output;
    a first stage gain for inputting said raw video signal and amplifying said raw video signal to a preselected level;
    an inverter electrically connected to said mixer;
    a switching transistor electrically connected to said inverter and to said first stage gain for sampling said raw video signal, said switching transistor being controlled by a signal from said mixer;
    a sample capacitor electrically connected to said switching transistor for storing said sampled video signal;
    a reset electrically connected between said inverter and said sample capacitor for clearing said sample capacitor upon a preselected reset signal;
    a hold circuit electrically connected to said sample capacitor for maintaining said sampled video signal until a fresh sample pulse occurs; and
    a second stage gain electrically connected to said hold circuit for inputting the output of said hold circuit and amplifying said hold circuit output to a preset level.

2. A sample video amplifier for operating on a raw video signal from a charge coupled device array having a master clock signal, and multiple phase horizontal shift signals, said sample video amplifier comprising:
    a first stage gain;
    a switching circuit electrically connected to said first stage gain;
    a sample and hold circuit electrically connected to said switching circuit;
    a clocking circuit effectively connected to said switching circuit and having inputs from the master clock signal and one of said horizontal shift signals; and
    a second stage gain electrically connected to said sample and hold circuit;
    said sample and hold circuit being isolated from background noise in said first stage gain by said switching circuit, and said clocking circuit being synchronized to said master clock signal, causing said sample pulse to drift with said raw video signal;
    whereby raw video input to said first stage gain is amplified to a first preselected level, is sampled, and the sample amplified to a second preselected level without the transmission of noise spikes or the loss of video caused by drifting of the master clock.

* * * * *